United States Patent [19]

Barberis et al.

[11] 4,320,500
[45] Mar. 16, 1982

[54] METHOD OF AND SYSTEM FOR ROUTING IN A PACKET-SWITCHED COMMUNICATION NETWORK

[75] Inventors: Giulio Barberis; Livio Lambarelli, both of Turin; Giorgio Micca, Rivoli-Torino, all of Italy

[73] Assignee: CSELT - Centro Studi e Laboratori Telecomunicazioni S.p.A., Turin, Italy

[21] Appl. No.: 120,109

[22] Filed: Feb. 8, 1980

Related U.S. Application Data

[63] Continuation-in-part of Ser. No. 25,186, Mar. 29, 1979, abandoned.

[30] Foreign Application Priority Data

Apr. 10, 1978 [IT] Italy ..................... 67782 A-78

[51] Int. Cl.³ ..................... H04Q 11/04; H04J 6/00
[52] U.S. Cl. ..................... 370/60; 370/94
[58] Field of Search ..................... 370/60, 94, 92

[56] References Cited

U.S. PATENT DOCUMENTS 4,074,232 2/1978 Otomo et al. ..................... 370/60
4,168,400 9/1979 de Couasnon et al. ..................... 370/94

OTHER PUBLICATIONS

"A Minimum Delay Routing Algorithm using Distributed Computation", by Gallager, IEEE Transactions on Communications, vol. COM-25, No. 1, Jan. 1977, pp. 73-84.

"The Modeling of Adaptive Routing in Data-Communication Networks", by Segall, IEEE Transactions on Communications, vol. COM-25, No. 1, Jan. 1977, pp. 85-95.

"Problemi e Prospettive Della Commutazione Di Pacchetto", by Artom, Electronica e Telecomunicazioni, N. 5-1976, pp. 195-201.

*Primary Examiner*—Douglas W. Olms
*Attorney, Agent, or Firm*—Karl F. Ross

[57] ABSTRACT

A node in a packet-switching data-transmission network has a processor distributing incoming messages or packets from a receiving buffer to transmitting buffers selected according to routing data established by an updating circuit which algebraically combines incremental delays with respective path delays to obtain total delays assigned to message transmission from the processor over respective transmitting buffers and associated outgoing transmission paths. The increment delays assigned to the respective buffers are calculated by a delay estimator utilizing data from the processor including packet-service times and arrival and departure times of the packets in the various buffers, the path delays assigned to routes extending from the respective transmitting buffers to a terminal node being communicated to the updating circuit via the processor from nodes connected downstream of the transmitting buffers.

12 Claims, 7 Drawing Figures

| | $a_1$ | $a_2$ | $a_3$ | $a_4$ | $a_5$ | $a_6$ | $a_7$ | $a_8$ | $a_9$ |
|---|---|---|---|---|---|---|---|---|---|
| $L_1$ | N | Y | Y | N | N | Y | N | Y | N |
| $L_2$ | Y | | | N | N | | N | | N |
| $L_3$ | | Y | Y | Y | Y | N | N | N | N |
| $L_4$ | | N | Y | N | Y | | | | |
| $L_4'$ | | | | | | N | N | Y | Y |

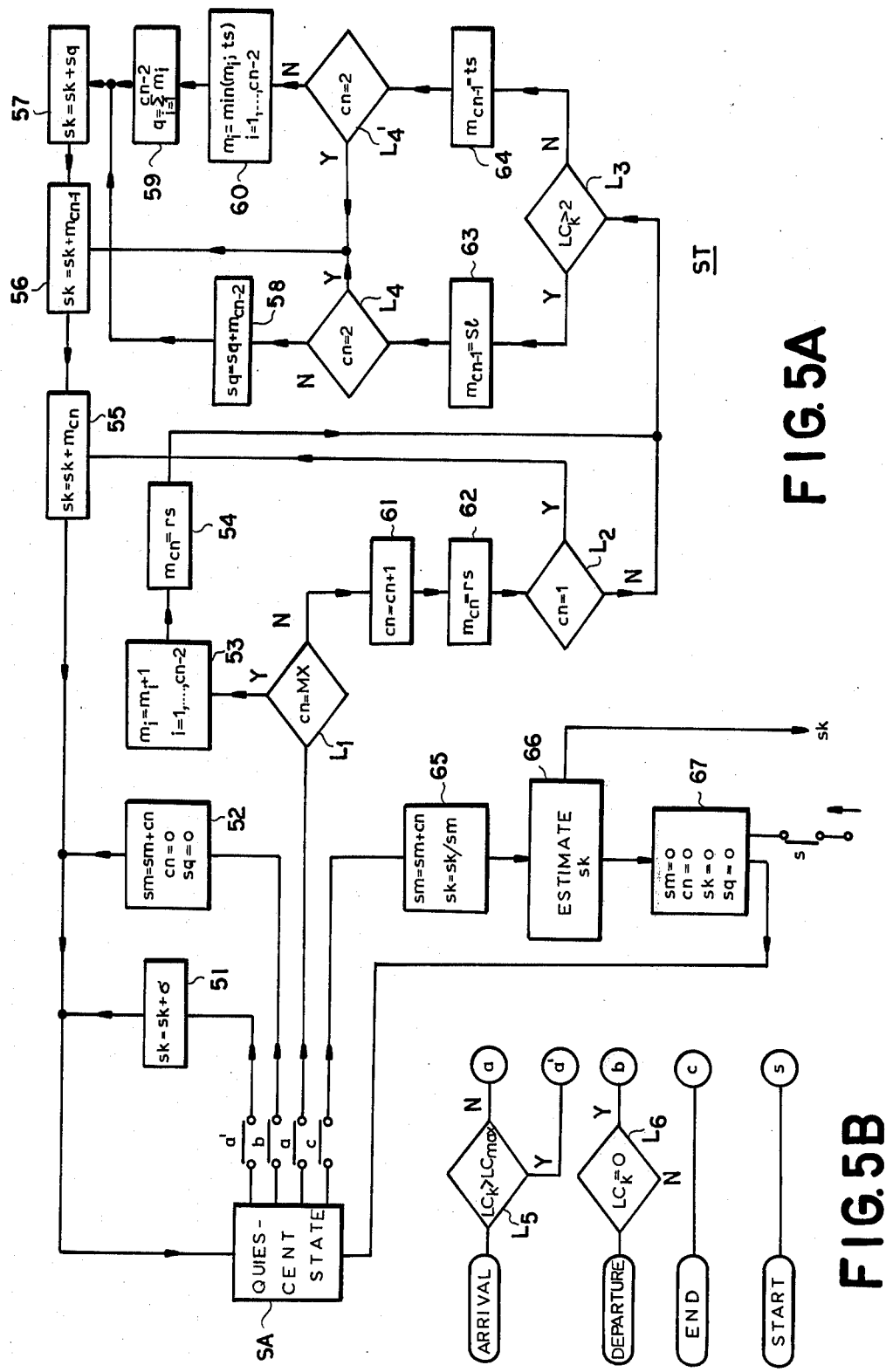

METHOD OF AND SYSTEM FOR ROUTING IN A PACKET-SWITCHED COMMUNICATION NETWORK

CROSS-REFERENCE TO RELATED APPLICATION

The present application is a continuation-in-part of our copending application Ser. No. 025,186 filed Mar. 29, 1979 and now abandoned.

FIELD OF THE INVENTION

Our present invention relates to a data-transmission network and, more particularly, to a method of and a system for routing messages or packets in a packet-switching communication network.

BACKGROUND OF THE INVENTION

A packet-switching telecommunication network, relatively new in the field of data transmission, basically consists of a network of queues. The central design problem is the routing of messages in order to minimize the average delay of packets in the queues, taking into account variations in traffic over time and potential sources of failure. An examination of the problem is provided by A. Artom in the article "Problems and Outlook of Packet-switching Telecommunications" published in *Elettronica e Telecomunicazioni* No. 5, 1976, pages 195–201.

Known methods of routing messages or packets generally rely on an analysis of the state of the system, which in turn includes inspection of queue lengths and an estimation of the incremental delay at each queue with respect to hypothetical infinitesimal variations in traffic flow, as described by A. Segall in an article entitled "The Modeling of Adaptive Routing in Data-Communication Networks" published in *IEEE Transactions on Communications*, Vol. COM-25, No. 1, January 1977, pages 85–94. The estimation may be used either by the individual nodes, in conjunction with information received from adjacent nodes, or by a centralized supervising node or unit for updating routing tables stored at the nodes. An example of a distributed method for updating routing tables is described by R. Gallager in an article entitled "A Minimum Delay Routing Algorithm Using Distributed Computation" published in the same issue of *IEEE Transactions on Communications*, pages 73–84.

Conventional methods of estimating incremental delays are generally unsatisfactory, owing to the rapid escalation of operations with increasing packet flow. Thus, backup becomes very difficult to eliminate once it has arisen. Another disadvantage of these known methods is the complexity involved therein, which results in increased costs of the devices implementing the methods and in increased congestion due to the necessity of transmitting greater amounts of information.

OBJECTS OF THE INVENTION

An object of our present invention is to provide a simplified method of calculating incremental delays and of routing addressed message packets to facilitate the elimination of congestion.

Another object of our present invention is to provide an efficient system for implementing such a method.

SUMMARY OF THE INVENTION

In a routing node of a packet-switching data-transmission network, a processor transfers incoming message packets from a receiving buffer to transmitting buffers selected by the processor in accordance with routing data stored in a table in a memory of the processor. Delay-estimation circuitry supplies in coded form to the processor incremental delays assigned to respective buffers, these delays being calculated by the delay-estimation circuitry according to a predetermined algorithm utilizing data from the processor including at least in part the arrival and departure times of the packets in the buffers. Additional circuitry is connected to the processor for updating routing data in the table. This updating circuitry receives delay-increment data from the delay-estimation circuitry for determining total delay times assigned to transmission paths extending from the routing node to a terminal node of the network.

According to another feature of our present invention, the updating circuitry includes first and second read/write memories respectively connected to the processor and to the delay-estimation circuitry for respectively storing delay-time data assigned to paths extending from the transmitting buffers to the terminal node and incremental delays assigned to the associated transmitting buffers. An adder is connected to a logic network and to the memories for summing, in response to signals from the logic network, incremental delays from the second memory and respective delay-time data from the first memory to determine total delay times assigned to routes extending from the processor over respective transmitting buffers to the terminal node. A comparator operationally linked to the logic network and to the adder serves to determine a route having a minimal total delay time for message-packet transmission from the processor to the terminal node.

It is, of course, probable that a data-transmission system will have a plurality of terminal nodes each connected to the processor via two or more transmitting buffers. In this case, the first memory has a plurality of storage areas equal in number to the terminal nodes, each area being subdivided into a plurality of sections equal in number to the transmitting buffers for registering incremental delay times assigned to paths extending from the respective transmitting buffers to a respective terminal node.

According to another feature of our present invention, the delay-estimation circuitry includes a counter, a register, a data store and an arithmetic unit. The counter stores the number of packets received by a transmitting buffer during a busy period, while the register sums the numbers of packets tallied by the counter during all the busy periods in an estimation interval determined by the processor. The data store receives from the processor, for temporary memorization, data including packet-service times in the transmitting buffers and time intervals necessary to complete servicing in the transmitting buffers of packet queues temporarily stored therein. The arithmetic unit performs, on data received from the register and from the data store, addition and division operations to determine incremental changes in delays arising from hypothetical changes in message flow, the arithmetic unit being connected to the updating circuitry for delivering calculated incremental delays thereto.

The delay-estimation circuitry further includes read/write storage means for temporarily memorizing data relating to its operational state and a programmable read-only memory for storing instructions controlling the delay-estimation process. A logic circuit controls the operations of the arithmetic unit in response to signals from the processor and according to instructions stored in the read-only memory and state data in the storage means. The logic circuit is also coupled to the data store for controlling reading and writing operations therein, while the storage means is connected to the processor for receiving in coded form therefrom the lengths of queues in the transmitting buffers.

According to an advantageous feature of our present invention, the delay-estimation circuitry includes a shift register deducting, in response to signals from the logic circuit, a coded number from the counter tallying the message packets received by a transmitting buffer during a busy period. A pointer connected to the logic circuit receives therefrom a signal coding a memory area assigned to a transmitting buffer which has experienced, during a concurrent busy period, an amount of traffic monitored by the counter and sent in coded form to the shift register. An adder algebraically combines address portions from the shift register and from the pointer to obtain a complete address supplied to the data store.

According to another advantageous feature of our invention, a comparator is connected to the processor and to the data store for loading a coded number from the processor into a memory location of the data store upon finding that the number from the processor is exceeded by a number previously stored in the memory location.

Pursuant to a further aspect of our present invention, a method of routing an addressed message packet from a given node of the data-transmission network to a terminal node thereof comprises the steps of at least temporarily storing path delays assigned message-packet transmission over a plurality of outgoing transmission paths extending to the terminal node from respective transmitting buffers included in the given node; calculating, at least partially on the basis of queue lengths at the given node, incremental delays assigned to the respective buffers; adding the incremental delays to respective path delays to obtain total delay times assigned to respective buffers; comparing the total delay times to determine a minimal total delay time; and supplying the packet from the given node over a buffer and an outgoing transmission path having the determined minimal delay time. If there are nodes in the network upstream of the given node, the same includes a receiving buffer selectively connectable to each outgoing buffer operationally linked to a respective transmission path. In that case, the routing method according to our present invention further comprises the steps of calculating an incremental delay assigned to the receiving buffer and adding this delay to the minimal total delay time. The result of the algebraic combination is then communicated from the given node to the upstream nodes.

BRIEF DESCRIPTION OF THE DRAWING

These and other features of our present invention will now be described in detail, reference being made to the accompanying drawing in which:

FIG. 5A is a flow chart illustrating the operation of the estimator of FIGS. 1B and 2; and FIG. 5B is a flow-chart diagram indicating the selective effectuation of estimator operations by the processor of FIG. 1B.

SPECIFIC DESCRIPTION

Figure 1A:
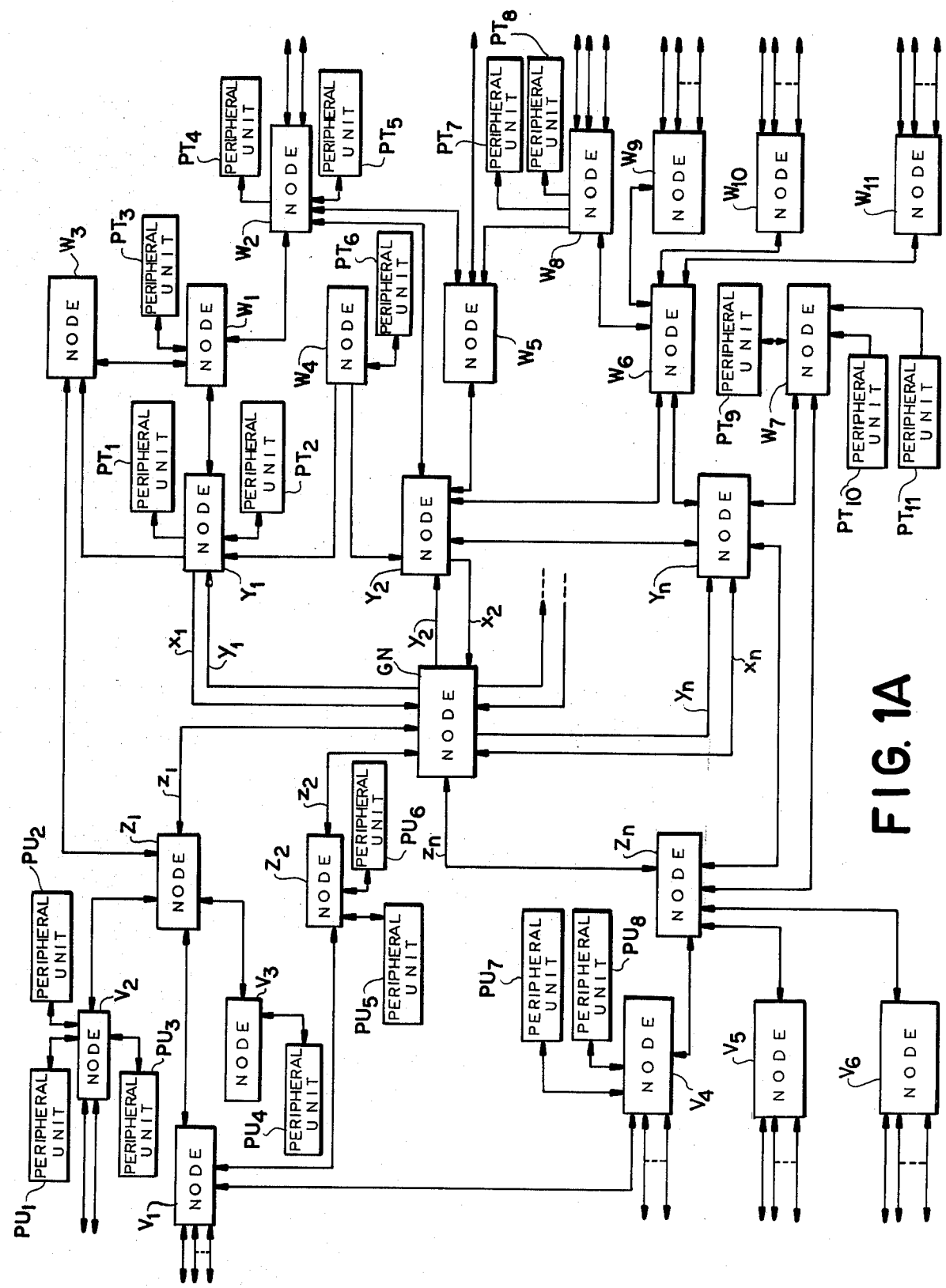
FIG. 1A is a block diagram of a packet-switching data-transmission network having routing nodes according to our present invention.
Figures 1B, 3:
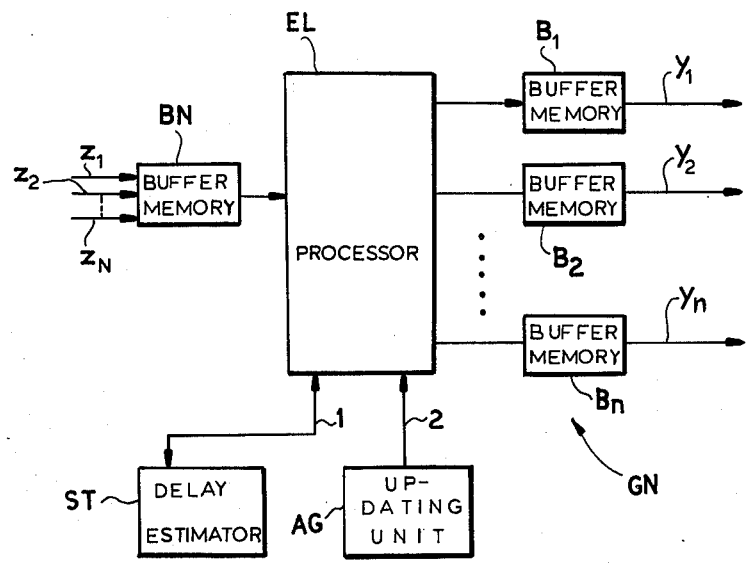
FIG. 1B is a block diagram of a routing node seen in FIG. 1A, showing a delay estimator, an updating circuit and a processor.
FIG. 3 is a table indicating possible operational states of the estimator shown in FIGS. 1B and 2.

As illustrated in FIG. 1B, a node GN in a packet-switching data-transmission or telecommunications network (FIG. 1A) according to our present invention comprises a receiving buffer memory BN for temporarily storing incoming addressed messages or packets and n transmitting buffer memories $B_1, B_2 \ldots B_n$ for temporarily storing outgoing message packets. The incoming packets arrive over leads $z_1, z_2 \ldots z_N$ from nodes $Z_1, Z_2 \ldots Z_N$ upstream of node GN in the network and are transferred from buffer memory BN to buffers $B_1-B_n$ by a processor EL according to routing data stored in a memory of the processor. Buffers $B_1-B_n$ transmit messages over respective leads $y_1, y_2 \ldots y_n$ to nodes $Y_1, Y_2 \ldots Y_n$ which may be terminal nodes for the transmitted packets or may serve as intermediate nodes relaying messages to nodes $W_1, W_2 \ldots$ further downstream in the network. Generally, the packets originate in peripheral units $PU_1, PU_2 \ldots$ connected to upstream nodes $V_1, V_2 \ldots$ or $Z_1-Z_N$ and are routed over node GN and relay nodes $Y_1-Y_n$ to peripheral units $PT_1, PT_2 \ldots$ connected thereto and to downstream nodes $W_1, W_2 \ldots$. Messages, however, may also be transmitted between nodes only.

As described in detail hereinafter, processor EL transfers a packet from receiving buffer BN to an outgoing buffer $B_1-B_n$ selected to minimize the total delay experienced by the packet during transmission via the selected buffer and a path extending therefrom over an associated relay node $Y_1-Y_n$ to a terminal node identified by address bits included in the packet. Thus, a packet destined for terminal node $W_2$ (see FIG. 1A) may be routed by processor EL over node $Y_1$ rather than over node $Y_2$ because the delay projected for transmission over buffer $B_1$ and nodes $Y_1, W_1$ could be less than the delay calculated for transmission over buffer $B_2$ and node $Y_2$. These projected delays encompass incremental changes arising from hypothetical increases in message traffic and are computed by an updating unit AG (FIG. 1B) on the basis of information arriving at processor EL over leads $x_1, x_2 \ldots x_n$ extending from nodes $Y_1, Y_2 \ldots Y_n$ and on the basis of calculations executed by a delay-estimation circuit ST. Components ST and AG are linked with processor EL by respective line multiples 1 and 2.

Figure 2:
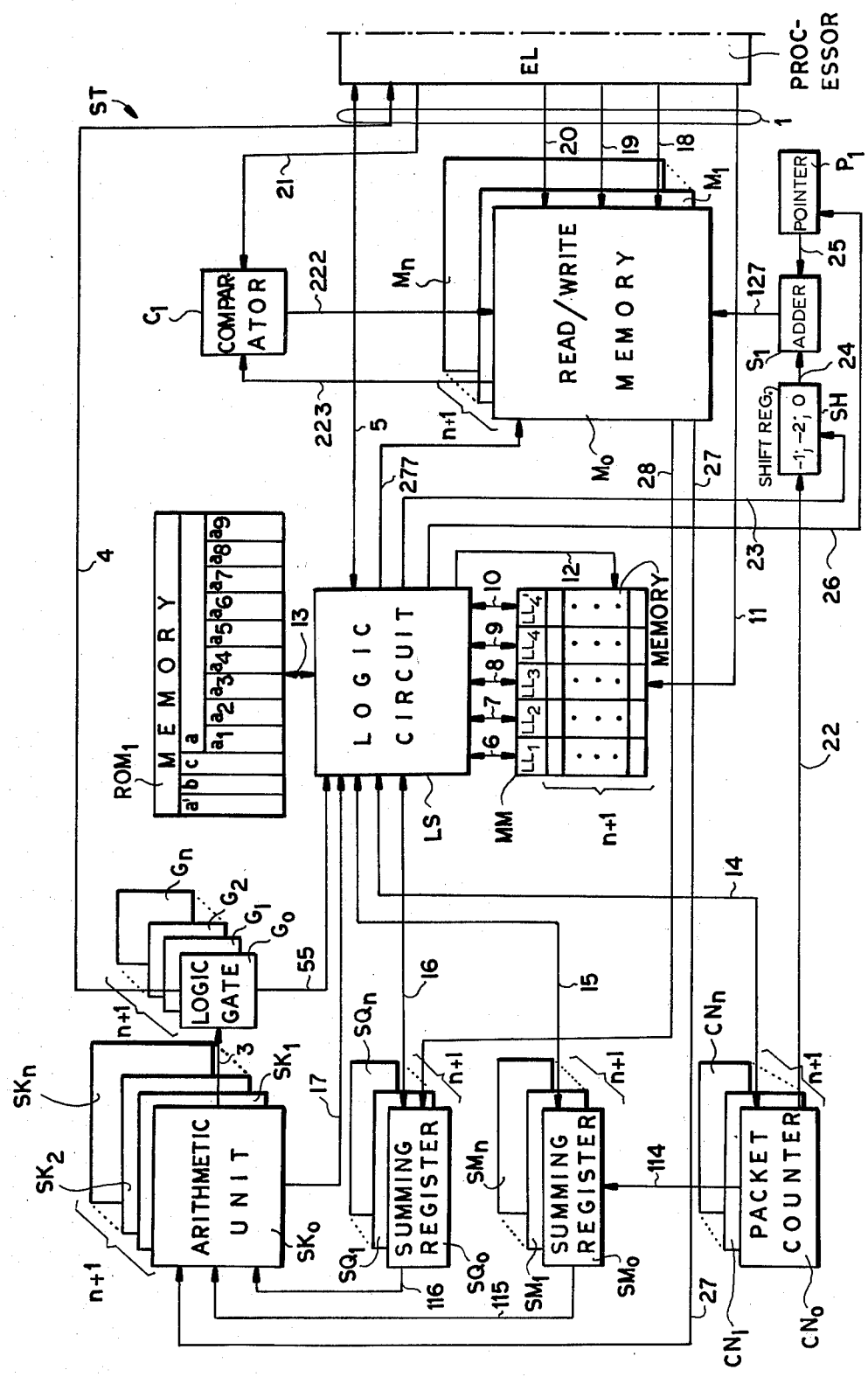
FIG. 2 is a block diagram of the delay estimator shown in FIG. 1B.

As illustrated in FIG. 2, delay estimator ST includes a logic circuit LS controlled by signals transmitted over a multiple 5 from processor EL. In response to instructions from the processor, logic circuit LS emits stepping pulses over two-way lines 14 to n+1 counters $CN_0-CN_n$ which in turn work via output leads 114 into respective summing registers $SM_0-SM_n$. Counters $CN_0-CN_n$ transfer their contents to registers $SM_0-SM_n$ upon receiving respective transmission commands from logic circuit LS. Registers $SM_0-SM_n$ are tied to logic circuit LS via bidirectional lines 15 and to respective arithmetic units $SK_0-SK_n$ via output leads 115. Under the control of logic circuit LS, registers $SM_0-SM_n$ add to their contents the coded values arriving over leads 114 from the associated counters $CN_0-CN_n$; upon receiving transmission commands from logic circuit LS, summing registers $SM_0-SM_n$ transfer their contents to the corresponding arithmetic units $SK_0-SK_n$. These latter units receive further data from respective registers $SQ_0-SQ_n$ via input leads 116 and perform operations upon arriving data and previously stored data according to instructions received from logic circuit LS over bidirectional line 17. The results of these operations are transmitted to processor EL via output leads 3 extending from arithmetic units $SK_0-SK_n$ to respective logic gates $G_0-G_n$; signals emitted by logic circuit LS over control leads 55 enable the logic gates to connect the leads 3 to respective leads 4 extending to processor EL.

As further shown in FIG. 2, logic circuit LS works via a bidirectional connection 13 into a programmable read-only memory ROM, divided into four main storage areas containing sets of instructions a, a', b, c for respective operational sequences to be performed by delay estimator ST, as described more fully hereinafter with reference to FIGS. 5A and 5B. Instruction set a in turn comprises nine command sequences $a_1-a_9$ selectively read by logic circuit LS in accordance with the contents of a read/write memory MM. This memory is partitioned into four blocks $LL_1$, $LL_2$, $LL_4$, $LL_4'$, tied to logic circuit LS via respective bidirectional leads 6, 7, 9, 10, and a fifth block $LL_3$ having an output lead 8 working into logic circuit LS and an input lead 11 extending from processor EL. Memory blocks $LL_1-LL_4$, $LL_4'$ are each subdivided into n+1 cells addressed by logic circuit LS via a lead 12 and containing data relating to the state of estimator ST. In particular, blocks $LL_1$, $LL_2$ store logic bits specifying whether the numbers of message packets received by buffers $B_1-B_n$, BN during respective busy periods are equal to the maximum permissible number of packets or to unity; blocks $LL_4$, $LL_4'$ store bits specifying whether the numbers of packets received by the buffers during respective busy periods are equal to two. Memory block $LL_3$ is loaced by processor EL via lead 11 with data pertaining to the lengths of the queues at buffers $B_1-B_n$, BN.

As illustrated in FIG. 2, estimator ST also includes n+1 read/write memories $M_0-M_n$ respectively working into arithmetic units $SK_0-SK_n$ and into summing registers $SQ_0-SQ_n$ via output leads 27, 28. Memories $M_0-M_n$ receive data from processor EL over input leads 18, 19, 20, these data being loaded into them at addresses transmitted in code over leads 127 from an adder $S_1$. Adder $S_1$ combines signals arriving over leads 24, 25 from a shift register SH and a pointer $P_1$ connected to logic circuit LS by respective leads 23, 26. During an initial phase of a cycle of operation of estimator ST, as described more fully hereinafter with reference to FIGS. 5A and 5B, pointer $P_1$ transfers from logic circuit LS the identity of one of the memories $M_0-M_n$ having contents to be updated by processor EL or to be read out to the corresponding arithmetic unit $SK_0-SK_n$ over lead 27 or to the associated summing register $SQ_0-SQ_n$ over lead 28. The address of a cell with the selected memory $M_0-M_n$ designed to receive or transmit information is determined by signals emitted by logic circuit LS and counters $CN_0-CN_n$.

Memories $M_0-M_n$ are tied via input and output leads 222, 223 to a comparator $C_1$ having an input lead 21 extending from processor EL. Comparator $C_1$ loads encoded numerical data from processor EL into an addressed cell in a memory $M_0-M_n$ upon determining that these data exceed in value the numerical data previously stored at this location. Memories $M_0-M_n$ receive reading and writing commands from logic circuit LS via leads 277.

Connections 4, 5, 11 and 18-21 are all part of the multiple 1 shown in FIG. 1B.

Figure 4:
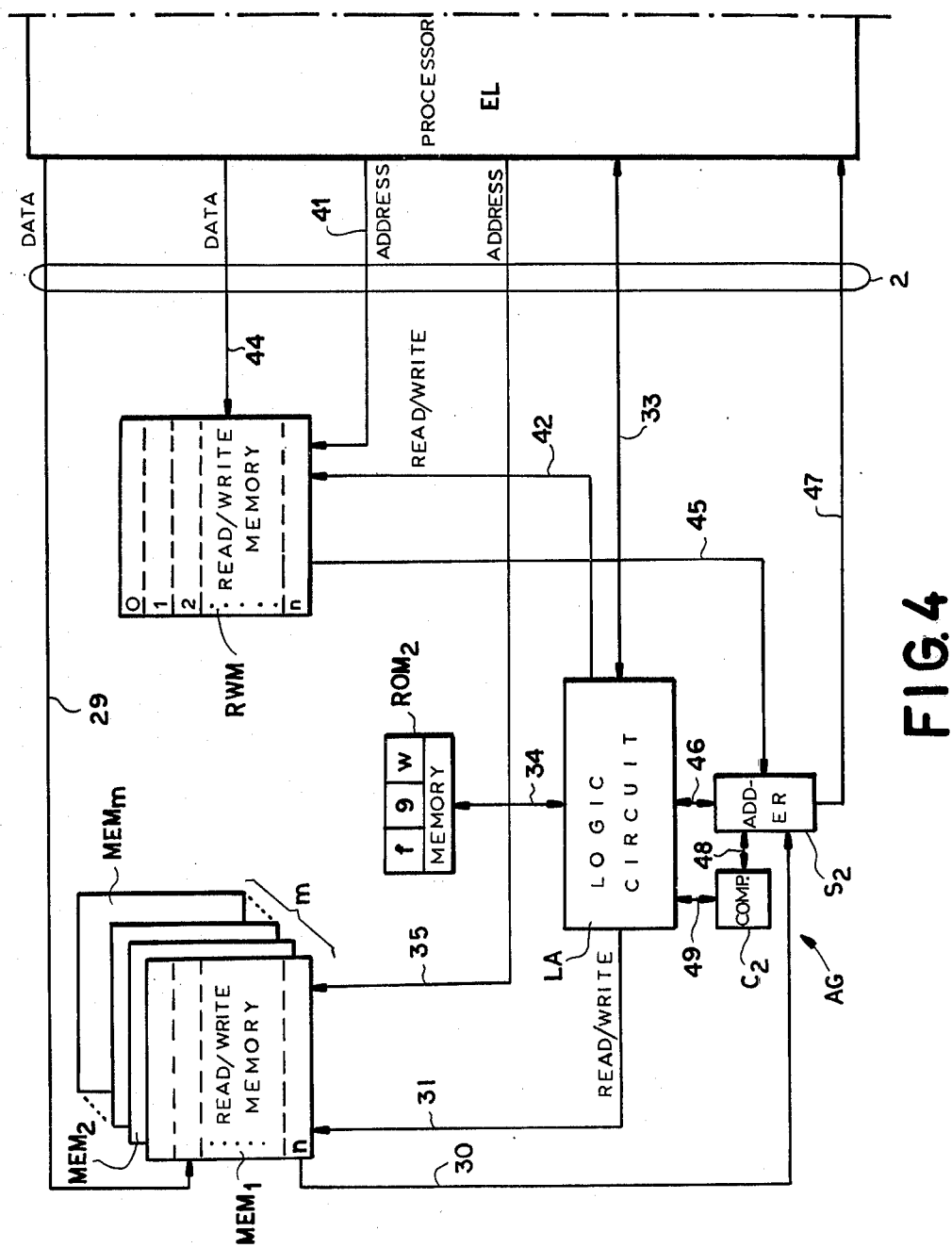
FIG. 4 is a block diagram of the updating circuit shown in FIG. 1B.

As illustrated in FIG. 4, updating unit AG includes m read/write memories $MEM_1-MEM_m$ each partitioned into n sections, a read/write memory RWM partitioned into n+1 sections and a programmable read-only memory $ROM_2$ divided into three areas containing respective sets of instructions f, g, w which determine operational procedures of unit AG. Read/write memories $MEM_1-MEM_n$ receive data from processor EL over leads 29, addresses from the processor over leads 35 and read/write commands from a logic circuit LA over leads 31 and transmit data via leads 30 to an adder $S_2$. This adder has an input multiple 45 extending from memory RWM which in turn is connected to processor EL via multiples 41, 44 and to logic circuit LA via a multiple 42 for receiving addresses, data and read/write commands. Logic circuit LA is connected to processor EL, to memory $ROM_2$ and to adder $S_2$ via respective two-way multiples 33, 34, 46. A comparator $C_2$ communicates with logic circuit LA and with adder $S_2$ by means of multiples 49, 48. Connections 29, 33, 35, 41, 44 and 47 are all part of the multiple 2 shown in FIG. 1B.

It will be observed that the m memories $MEM_1-MEM_m$ of updating unit AG are one less in number than the nodes in a packet-switching communication network according to our present invention and that each memory $MEM_1-MEM_m$ is partitioned into n sections equal in number to the transmitting buffers $B_1-B_n$. Thus, m represents the number of possible terminal nodes or destinations for a message packet being transmitted from the node GN shown in FIGS. 1A and 1B while n represents the number of possible paths along which a message packet may be transmitted from node GN to a selected terminal node. Let us assume that the node GN is the $O^{th}$ or the $(m+1)^{th}$ node in the network, so that the possible terminals may be designated by m consecutive digits j=1,2 ... m. Each memory $MEM_j$ (j=1,2 ... m) shown in FIG. 4 stores n encoded delay times $e_{j,1}$, $e_{j,2}$ ... $e_{j,n}$ assigned to message-packet transmissions over paths or links extending from respective buffers $B_1-B_n$ to the $j^{th}$ node: the $k^{th}$ (k=1,2 ... n) section of the $j^{th}$ memory $MEM_j$ contains in coded form the minimum delay $e_{j,k}$ experienced by a message or packet unit during transmission from buffer $B_k$ to the $j^{th}$ node of the network. Upon the reception by the memories $MEM_1-MEM_m$ of writing commands from logic circuit LA over multiple 31, these delays are loaded from processor EL via leads 29 into memories $MEM_1-MEM_m$ at addresses emitted by processor EL over leads 35. Logic circuit LA generates writing commands according to read/write instructions w stored in an area of memory $ROM_2$.

It will also be observed that memory RWM is partitioned into n+1 sections equal in number to all the buffers BN, $B_1$-$B_n$ of node GN. Memory RWM stores incremental delays $d_0, d_1, d_2 \ldots d_n$ calculated by estimator ST, as described in detail hereinafter with respect to FIG. 5A, and assigned to respective buffers BN, $B_1$-$B_n$. Each incremental delay $d_0, d_1$-$d_n$ increases the delay experienced by the entire packet-switch system upon an increase of one message unit in the packet flow through one of the buffers BN, $B_1$-$B_n$.

Adder $S_2$ (FIG. 4), operating under the control of logic circuit LA, algebraically combines an incremental delay $d_k$ ($k=1,2\ldots n$) from memory RWM with a path delay $e_{j,k}$ from a memory $MEM_j$ ($j=1,2\ldots m$) to obtain a total delay time $s_{j,k}$ for a message-packet transmission from processor EL over a respective transmitting buffer $B_1$-$B_n$ to the $j^{th}$ node of the network. If logic circuit LA is proceeding according to instructions g stored in memory $ROM_2$, the result of the addition operation in unit $S_2$ is transmitted over lead 47 to processor EL. If, however, instructions f are being read by logic circuit LA, adder $S_2$ will perform multiple addition operations to obtain a sequence of total delay times $s_{j,1}, s_{j,2}\ldots s_{j,n}$ each transmitted to logic circuit LA for temporary storage prior to comparison in unit $C_2$ with a total delay time $s_{j\ min}$ constituting the minimum of the previously transmitted total delay times. Upon the execution of n additions by unit $S_2$ and $n-1$ comparisons by unit $C_2$, logic circuit LA transmits to processor EL via multiple 33 the identity of the buffer $B_1$-$B_n$ included in the transmission path having the minimal total delay time $s_{j\ min}$, this identity being stored by processor EL in a routing table associating with each destination node of rank 1 to m a buffer $B_1$-$B_n$ over which message packets received by buffer BN are to be transmitted by processor EL. Under the control of processor EL, logic circuit LA periodically induces the summation of incremental delay $s_{j\ min}$ assigned to message-packet transmission from the given node GN to the destination node of rank j, the resulting sum being forwarded by the processor EL to nodes working into buffer BN. This sum constitutes a path delay for message-packet transmission from such upstream nodes over the given node to the destination node.

Before describing the operation of a packet-switching telecommunication node having an estimator ST according to our present invention, we shall now discuss theoretical considerations forming the basis upon which estimator ST operates. In general, unit ST calculates incremental changes in delay time $d_0, d_1 \ldots d_n$ arising from hypothetical incremental changes in packet flow $\Delta r_0, \Delta r_1 \ldots \Delta r_n$ through the respective buffers BN, $B_1$-$B_n$. Using incremental delays $d_1 \ldots d_n$ and path delays $e_{j,1}, e_{j,2} \ldots e_{j,n}$, processor EL and updating unit AG construct routing tables, as heretofore described with reference to FIG. 4, these tables being based on information as to marginal delays to each destination. Message packets are routed by processor EL according to the instantaneous lengths of the queues at buffers BN, $B_1$-$B_n$ and according to periodically updated information, e.g. path delays $e_{j,k}$, from neighboring nodes.

Let us assume that, in a packet-switching telecommunication network having Q nodes, the delay $D_{p,q}$ over a transmission link between nodes p, q is a function only of the flow $r_{p,q}$ over this link. The total delay $D_t$ in the network is the sum of the delays $D_{p,q}$ over all the individual links (p, q):

$$D_t = \sum_{p=1}^{Q} \sum_{q=1}^{Q} D_{p,q}(r_{p,q}). \tag{1}$$

The change $\Delta D_t$ in total delay with a new message is:

$$\Delta D_t = \sum_{p=1}^{Q} \sum_{q=1}^{Q} \frac{\delta D_{p,q}}{\delta r_{p,q}} \Delta r_{p,q} \tag{2}$$

or:

$$\Delta D_t = \sum_{p=1}^{Q} \sum_{q=1}^{Q} \frac{dD_{p,q}}{dr_{p,q}} \Delta r_{p,q} \tag{3}$$

where $\Delta r_{p,q}$ is the change in message flow over link (p, q). Thus the incremental change in delay over link (p, q) per unit change in message flow ($\Delta r_{p,q} = 1$) is equal to the derivative of delay with respect to flow:

$$d_{p,q} = \frac{dD_{p,q}}{dr_{p,q}}. \tag{4}$$

Likewise, the incremental change $d_k$ ($k=0, 1, 2\ldots n$) in delay for message-packet transmission over a buffer BN, $B_1$-$B_n$ is equal to the derivative of delay with respect to message flow through the buffer. This derivative may be estimated by a summing and dividing operation according to the formula:

$$d_k = \frac{\sum_{z=1}^{B_T} \sum_{h=1}^{N_z} \sum_{l=1}^{N_z} c_l^h(k)}{\sum_{z=1}^{B_T} N_z} \tag{5}$$

where $B_T$ is the number of busy periods undergone by the $k^{th}$ buffer BN ($k=0$), $B_k$ ($k=1\ldots n$) during a predetermined estimation interval T; $N_z$ is the number of message packets serviced by the $k^{th}$ buffer during the $z^{th}$ busy period ($z=1,2\ldots B_T$); l and h are integers designating packets in the same busy period (l,h=1, 2 . . . $N_z$); and $c_l^h(k)$ is the time the $l^{th}$ packet would have saved in the $k^{th}$ buffer if the $h^{th}$ packet had not existed.

Formula (5) is implemented by estimator ST with information received from processor EL, such information including packet-service intervals $sp_h$ and arrival and departure times $\alpha_h$ and $\delta_h$ of packets relative to the $k^{th}$ buffer. The following relations are realized by estimator ST in the presence of implementing formula (5):

$$c_l^h(k) = 0 \quad \text{for } l < h \tag{6}$$

$$c_l^h(k) = \delta_h - \alpha_h \quad \text{for } l = h. \tag{7}$$

If the length $LC_k$ of the queue at the $k^{th}$ buffer is equal to 2, then:

$$c_{h+1}^h(k) = \delta_h - \alpha_{h+1} \tag{8}$$

$$c_l^h(k) = \min(c_{l-1}^h, \delta_{l-1} - \alpha_l) \text{ for } l > h + 1. \tag{9}$$

If queue length $LC_k$ is greater than 2, then:

$$c_{h+1}^h = sp_h \tag{10}$$

-continued $$c_l^h = c_{l-1}^h \text{ for } l > h + 1. \tag{11}$$

The operation of estimator ST will now be described with reference to FIGS. 3, 5A, 5B. At the onset of an estimation interval T for a generic buffer $B_k$ ($k=0, 1 \ldots n$; $B_0 = BN$), logic circuit LS resets units $CN_k$, $SM_k$, $SQ_k$, $SK_k$ according to a start command s so that their contents cn, sm, sq, sk are returned to zero, as indicated in a block or step 67 of the flow diagram illustrated in FIG. 5A. Upon the execution of step 67, estimator ST enters a quiescent state SA in which the arrival of a message packet at one of the buffers BN, $B_1$-$B_n$ is awaited. Of course, a packet received by incoming buffer BN arrives from a neighboring node whereas a packet arriving at a transmitting buffer $B_1$-$B_n$ is transferred thereto from unit BN by processor EL according to information compiled in a routing table. Let us assume that the next packet arrives at buffer $B_k$. As indicated in FIG. 5B, such an arrival induces processor EL to investigate whether the queue length $LC_k$ at buffer $B_k$ is greater than a predetermined maximum permissible queue length $LC_{max}$. It is to be noted that the maximum queue length for the receiving buffer BN will generally be much greater than the maximum queue lengths for any of the transmitting buffers $B_1$-$B_n$.

If, in a step $L_5$ (FIG. 5B), processor EL finds that the queue length $LC_k$ at buffer $B_k$ ($k=0 \ldots n$) is greater than the permissible limit $LC_{max}$, logic circuit LS (FIG. 2) adds a predetermined constant $\sigma$ to the contents sk of unit $SK_k$, as shown in FIG. 5A at a flow-chart step 51, and returns the estimator to the quiescent state SA. The addition of constant $\sigma$ to contents sk is executed by logic circuit LS in accordance with instructions a'. Let us now assume that the queue length $LC_k$ at buffer $B_k$ ($k=0 \ldots n$) upon the arrival of a new message packet is less than the maximum permissible queue length $LC_{max}$. In accordance with instructions a stored in memory $ROM_1$ (FIG. 2), logic circuit LS reads via multiple 6 a bit stored in the $k^{th}$ cell of memory section $LL_1$ for determining whether contents cn of counting register $CN_k$ have attained a maximum number MX predetermined by the size of memory $M_k$. If count cn is less than this maximum, it is incremented by one under the command of logic circuit LS, as indicated in a step 61 of the flow chart shown in FIG. 5A. Logic circuit LS then updates the bits stored in the $k^{th}$ cells of memory sections $LL_1$, $LL_2$, $LL_4$ to indicate correctly whether contents cn of counter $CN_k$ are equal to maximum MX, to unity or to two, respectively. The bit stored in the $k^{th}$ cell of memory section $LL_4'$ is updated to contain the same information as the bit stored in the $k^{th}$ cell of section $LL_4$. It is to be noted that the count cn is recurrently incremented for counting the number of packets received by buffer $B_k$ during a contemporaneous busy period. At the end of a busy period, i.e. when the length $LC_k$ of the queue being serviced by buffer $B_k$ returns to zero, logic circuit LS initiates in a step $L_6$ (FIG. 5B) a sequence of operations determined by instructions b, these operations including the adding of contents cn to the contents sm of register $SM_k$ and the resetting of units $CN_k$ and $SQ_k$, as shown in FIG. 5A at a step 52.

Upon determining that count cn is not equal to maximum MX (step $L_1$) and upon stepping counter $CN_k$ (step 61), logic circuit LS emits a signal to shift register SH enabling same to transmit to adder $S_1$ an address portion determined by the contents of counter $CN_k$. Thus, if cn=1, i.e. if buffer $B_k$ is operating at the start of a busy period, a coded "one" will be loaded into adder $S_1$ for algebraic combination with another address portion fed thereto from logic circuit LS over pointer $P_1$, this further address portion coding the location of memory $M_k$ associated with buffer $B_k$. The combined address emitted by unit $S_1$ over leads 127 is received by memories $M_1$-$M_n$ together with signals from processor EL over leads 18 and a writing command from logic circuit LS over leads 277, the signal from processor EL coding the time rs for buffer $B_k$ to complete the transmission of all the packets in its queue, i.e. to reduce $LC_k$ to zero. It is to be observed that the time rs is the time saved in buffer $B_k$ by the $cn^{th}$ packet, i.e. by the packet last received, assuming that this packet had not existed. Thus, if cn=h, rs=$c_h^h$. For the first packet received in a busy period (cn=1), rs is the service time of such packet.

Upon the loading of time rs into the $cn^{th}$ cell $m_{cn}$ of memory $M_k$ (step 62 in FIG. 5A), circuit LS reads the bit stored in the $k^{th}$ cell of memory section $LL_2$ to determine whether the $cn^{th}$ packet is the first packet in a busy period (step $L_2$ in FIG. 5A). If cn=1, logic circuit LS operates according to instructions $a_1$, as indicated in the first column of the table in FIG. 3, to add the contents rs of cell $m_{cn}$ to the contents sk of arithmetic unit $SK_k$ (step 55 in FIG. 5A). The performance of this operation entails the addressing of memory $M_k$ by logic circuit LS via register SH, pointer $P_1$ and adder $S_1$; the sending of a reading command to memory $M_k$ from logic circuit LS; and the transmission of an addition command to arithmetic unit $SK_k$ over line 17. Time rs is transmitted from cell $m_{cn}$ to unit $SK_k$ over lead 27.

Let us assume now that count cn is equal to two and that the first packet in the busy period is still in buffer $B_k$ upon the arrival of the second packet. Then the answers to queries posed by logic circuit LS in steps $L_1$ and $L_2$ are both negative, as represented by "N" in FIGS. 3 and 5A, and a query posed by circuit LS in a step $L_3$ as to whether the length LC of the queue in buffer $B_k$ is greater than two also has a negative result (N). Upon incrementing the count cn, updating the bits in the $k^{th}$ cells of memory sections $LL_1$, $LL_2$, $LL_4$, $LL_4'$ and obtaining negative results for the queries of steps $L_2$ and $L_3$, logic circuit LS emits over lead 23 to register SH a signal shifting the output thereof by one unit, adder $S_1$ consequently transmitting to memories $M_1$-$M_n$ the address of the $(cn-1)^{th}$ cell $m_{cn-1}$ in memory $M_k$. Under the control of a writing command from circuit LS, a time ts is loaded into this cell from processor EL via the corresponding lead 19, this time specifying the interval necessary for buffer $B_k$ to complete the transmission of the first message packet. Time ts is thus the time saved by the second message packet in buffer $B_k$, assuming that the first message packet had not existed, and is equal to the departure time $\delta_1$ of the first packet from buffer $B_k$ less the arrival time $\alpha_2$ of the second packet at the buffer: ts=$\delta_1 - \alpha_2 = c_2^1$. Upon the completion of a step 64 (FIG. 5A) comprising the loading of time ts into the $(cn-1)^{th}$ cell of memory $M_k$, logic circuit LS reads the bit stored in the $k^{th}$ cell of memory section $LL_4'$ (step $L_4'$), yielding an affirmative answer (Y) to the query as to whether the number of packets in the present busy period is equal to two. This affirmative answer induces logic circuit LS to proceed according to instructions $a_9$ (see last column of FIG. 3), whereby contents ts of memory cell $m_1$ and contents rs of cell $m_2$ are added to contents sk of unit $SK_k$ in a pair of flow-chart steps 55 and 56, respectively.

Let us now assume that, upon the arrival of a message packet, the queue length $LC_k$ is less than the maximum $LC_{max}$ but is greater than two, so that queries $L_5$ and $L_3$ (FIGS. 5B and 5A) have a negative outcome (N) and a positive outcome (Y), respectively. Because $LC_k > 2$, count cn will also be greater than two. Let us also assume that this count is less than the maximum MX. In executing instructions a, circuit LS will control the incrementing of counter $CN_k$ (step 61), the loading of time rs into $m_{cn}$ of memory $M_k$ (step 62), the updating of the contents of memory MM and the loading of a coded time sl from processor EL via lead 20 into cell $m_{cn-1}$ of memory $M_k$, this time representing the interval necessary for servicing the $(cn-1)^{th}$ message packet in buffer $B_k$. As heretofore described with reference to instructions $a_1$ and $a_9$, logic circuit LS determines, at least in part by shifting register SH, the addresses utilized in memories $M_1$-$M_n$. It is to be noted that time sl is the time that would have been saved in buffer $B_k$ by the $cn^{th}$ packet had the $(cn-1)^{th}$ packet not existed: if $cn-1=h$, then $sl = c_{h+1}{}^h = sp_h$ (see equation 10).

Upon loading service time sl into cell $m_{cn-1}$ of memory $M_k$ and determining that contents cn of conter $CN_k$ are not equal to two, logic circuit LS commences a series of operations controlled by instructions $a_4$ in memory $ROM_1$. Logic circuit LS reads onto the corresponding lead 28 the service time stored in memory cell $m_{cn-2}$ for the $(cn-2)^{th}$ packet and emits signals to register $SQ_k$ inducing the addition of this service time to the contents sq of register $SQ_k$, as indicated in a step 58 in the flow-chart diagram of FIG. 5A. The increased contents sq are then transferred via multiple 116 to arithmetic unit $SK_k$ for algebraic combination with contents sk thereof (step 57 in FIG. 5A). Finally, service times sl and time rs are transmitted from cells $m_{cn-1}$ and $m_{cn}$ via lead 27 to arithmetic unit $SK_k$ for summation with contents sk (steps 56 and 57). By the time estimator ST has returned to the waiting state SA, contents sk have been updated to include the total time each packet received in the busy period by buffer $B_k$ would have saved therein had this packet and each of the packets preceding same not existed. It is to be observed that register contents sq are coded information regarding past packet traffic through node buffer $B_k$ and, more particularly, regarding alternate occurrences of packets in the buffer. Prior to the addition of the coded time stored in memory cell $m_{cn-2}$ to contents sq of register $SQ_k$ (step 58), these contents represent the time saved in buffer $B_k$ by the $(cn-1)^{th}$ message packet had the $(cn-3)$ packets preceding the $(cn-2)^{th}$ packet not existed; upon the addition of the service time of the $(cn-2)^{th}$ packet to the contents of register $SQ_k$, contents sq represent the time saved in buffer $B_k$ by the $cn^{th}$ packet received thereby had the first $(cn-2)$ packets in the busy period not existed. It is clear that register $SQ_k$, operating under the control of logic circuit LS, implements the recursive equation (11).

If, upon inquiring in step $L_4$ whether the number of packets received so far in a busy period is equal to two, logic circuit LS obtains a positive reply (Y), instructions $a_5$ (see FIG. 3) effectuate the bypassing of processing steps 57 and 58 and the execution of steps 55 and 56, as shown in FIG. 5A.

Let us assume that, before the arrival at buffer $B_k$ of the $cn^{th}$ message packet, the number of packets received by the buffer is not equal to zero, one or MX and that after the arrival of that packet the queue length $LC_k$ is greater than two but less than $LC_{max}$. In executing instructions a, logic circuit LS increments counter $CK_k$ (step 61), updates the binary data stored in the $k^{th}$ cells of memory sections $LL_1$, $LL_2$, $LL_4$, $LL_4'$, loads time rs from processor EL into memory cell $m_{cn}$ (step 62), and loads time ts into cell $m_{cn-1}$ (step 64). Upon receiving a negative reply (N) to inquiry $L_4'$, logic circuit LS begins a series of operations determined by instructions $a_7$ (see FIG. 3). Via shift register SH and adder $S_1$, circuit LS transmits to memory $M_k$ a sequence of addresses associated with memory cells $m_1, m_2 \ldots m_{cn-2}$. In synchronism with these addresses, logic circuit LS emits over the associated lead 277 reading commands for feeding the contents of cells $m_1$-$m_{cn-2}$ to comparator $C_1$ for comparison with time ts received thereby from processor EL over lead 21. If time ts is detected to have a magnitude less than any of the contents of cells $m_1$-$m_{cn-2}$, such contents are replaced in memory $M_k$ via the corresponding lead 222 by coded time ts, as indicated in FIG. 5A at a step 60. Upon the completion of the comparisons of step 60, logic circuit LS again transmits in sequence to memory $M_k$ the addresses of cells $m_1$-$m_{cn-2}$, commands simultaneously emitted over the aforementioned lead 277 inducing the transmission of the respective memory-cell contents over the associated lead 28 to register $SQ_k$ for algebraic combination under the control of signals from logic circuit LS on the corresponding lead 16. The result of this algebraic combination in a processing step 59 is substituted in register $SQ_k$ for contents sq and is subsequently transferred to register $SK_k$ for summation with contents sk (step 57). As heretofore described with respect to instructions $a_5$ and $a_9$, the contents of cells $m_{cn-1}$, $m_{cn}$ are then transmitted from memory $M_k$ to arithmetic unit $SK_k$ over the appropriate lead 27 for summation with contents sk (steps 55, 56, respectively). The comparison of the coded times stored in memory cells $m_1$-$m_{cn-2}$ with time ts in step 60 and the substitution of time ts for those memory-cell contents which exceed same are the implementation of equation (9).

If all m storage spaces available in memory $M_k$ are used up during a busy period, i.e. if the reading of counter $CN_k$ reaches MX, logic circuit LS initiates a processing step 53 for shifting the contents of memory cell $m_{i+1}$ to cell $m_i$, where $i = 1, 2 \ldots cn-2$. This shift is executed by logic circuit LS upon every new message-packet arrival subsequent to the first filling-up of memory $M_k$ during a busy period. Upon the completion of the shifting operation, circuit LS controls the loding into a last memory cell $m_{cn} = M$ of coded time rs (see FIG. 5A, step tr). In accordance with the contents of memory sections $LL_3$, $LL_4$, $LL_4'$ indicating whether queue length $LC_k$ is greater than two and whether $MX = 2$, logic circuit LS executes instructions $a_2$, $a_3$, $a_6$ or $a_8$ (see FIG. 3) which are fully equivalent to instructions $a_4$, $a_5$, $a_7$ or $a_8$, respectively, at least with regard to the loading of memory cell $m_{cn-1}$, the increasing of contents sq of register $SQ_k$ and the updating of contents sk.

As shown in an inquiry step $L_6$ of FIG. 5B, processor EL checks the queue length in each buffer BN, $B_1$-$B_n$ upon the departure of a message or packet therefrom, thereby determining whether the respective buffer has been emptied of packets. If a buffer $B_k$ $(k=0 \ldots n)$ is indeed devoid of packets, processor EL emits to circuit LS over line 5 a signal initiating the reading of instructions b from memory $ROM_1$. Operating under these instructions, circuit LS emits signals to counter $CN_k$ over the corresponding lead 14 inducing the transfer of the contents of this counter over the respective lead 114 to register $SM_k$ for algebraic combination with the contents sm thereof, as controlled by signals carried from circuit LS on the associated lead 15. Signals emitted by circuit LS over leads 14 and 16 then reset counter $CN_k$ and register $SQ_k$, completing a processing step 52 (FIG. 5A).

Upon the termination of estimation interval T, as measured by processor EL, logic circuit LS initiates a train of operations 65, 66, 67 (see FIG. 5A) according to instructions c. The contents cn of counter $CN_k$ are transmitted to summing register $SM_k$ via the appropriate lead 114 for algebraic combination with contents sm, the result being delivered to arithmetic unit $SK_k$ for division into contents sk. The resulting quotient, now forming the contents of registers in arithmetic unit $SK_k$, is the incremental delay estimate $d_k$ for message transmission over buffer $B_k$ ($k=1 \ldots n$, $B_0=BN$) and is loaded into the $k^{th}$ partition of memory RWM via gate $G_k$ and processor EL. As heretofore described, gate $G_k$ is enabled to transmit information from arithmetic unit $SK_k$ upon receiving a signal from circuit LS over its input lead 55. Upon the readout of contents $sk=d_k$, units $CN_k$, $SM_k$, $SQ_k$, $SK_k$ are reset by signals emitted by circuit LS over leads 14, 15, 16, 17 (step 67) and estimator ST returns to quiescent state SA.

The aforegoing description of the operation of estimator ST applies to any buffer BN, $B_1$-$B_n$. In general, the number of operating cycles performed by estimator ST in response to arrivals at receiving buffer BN during any estimation interval T will equal the number of cycles of operation initiated upon arrival of packets at transmitting buffers $B_1$-$B_n$ during the same interval. Components $CN_0$ and $M_0$ are advantageously dimensioned to store a greater amount of information than the respective counters $CN_1$-$CN_n$ and memories $M_1$-$M_n$, owing to the greater volume of traffic being channeled through buffer BN. Of course, the delay-estimating intervals allotted to the respective buffers are relatively staggered to facilitate interleaved real-time processing by estimator ST.

We claim:

1. In a packet-switching data-transmission network, a routing node comprising:
   a receiving buffer for temporarily storing incoming message packets;
   n transmitting buffers for temporarily storing departing packets;
   a processor connected to said buffers for transferring a packet from said receiving buffer to a transmitting buffer selected according to routing data stored in a table in said processor;
   delay-estimation circuitry connected to said processor for supplying thereto incremental delays assigned to respective buffers and calculated by said delay-estimation circuitry according to a predetermined algorithm utilizing data from said processor including at least in part arrival and departure times of packets in said buffers; and
   updating circuitry connected to said processor for modifying routing data in said table upon determining total delay times assigned to transmission paths extending from said routing node to a terminal node of said network, said data-modifying circuitry being connected to said delay-estimation circuitry for receiving delay increment data therefrom.

2. A routing node as defined in claim 1 wherein said up-dating circuit includes first read/write memory means connected to said processor for receiving therefrom delay-time data assigned to paths extending from said transmitting buffers to said terminal node; second read/write memory means connected to said delay-estimation circuitry for receiving therefrom calculated incremental delays assigned to said transmitting buffers; a logic circuit connected to said memory means and to said processor for controlling, at least partially in response to signals received therefrom, reading and writing operations in said first and second memory means; and an adder connected to said first and second memory means for summing incremental delays from said second memory means and delay-time data from said first memory means to determine total delay times assigned to routes extending from said processor over respective transmitting buffers to said terminal node.

3. A routing node as defined in claim 2 wherein said updating circuitry further includes a comparator connected to said adder and to said logic circuit for determining a route having a minimal delay time for message-packet transmission from said processor to said terminal node.

4. A routing node as defined in claim 2 or 3 wherein said network has a plurality of terminal nodes each connected to said processor via a plurality of transmitting buffers, said first memory means having a plurality of memory areas equal in number to said terminal nodes, each of said areas being subdivided into a plurality of sections equal in number to said transmitting buffers for storing delay times assigned to paths extending from respective transmitting buffers to a respective terminal node.

5. A routing node as defined in claim 1 wherein said delay-estimation circuitry includes counting means storing the number of packets received by a transmitting buffer during a busy period; register means connected to said counting means for summing the numbers of packets counted by said counting means during all the busy periods in an estimation interval determined by said processor; a read/write data stored connected to said processor for temporarily memorizing data including packet-service times in said transmitting buffers and times necessary to complete servicing in said transmitting buffers of packet queues temporarily stored therein; and arithmetic means connected to said register means and to said data store for performing, on data received therefrom, addition and division operations to determine incremental changes in delays arising from hypothetical incremental changes in message flow; said arithmetic means being connected to said updating circutry for delivering calculated incremental delays thereto.

6. A routing node as defined in claim 5 wherein said delay-estimation circuitry further includes read/write storage means for temporarily memorizing data on the state of said delay-estimation circuitry; a programmable read-only memory for storing instructions for the determination of delay estimates; and a logic circuit connected to said processor, said storage means, said read-only memory and said arithmetic means for controlling the operations thereof in response to signals from said processor and according to instructions stored in said read-only memory and state data in said storage means.

7. A routing node as defined in claim 6 wherein said storage means is connected to said processor for receiving in coded form therefrom the lengths of queues in said transmitting buffers.

8. A routing node as defined in claim 5, 6 or 7 wherein said delay-estimation circuitry further includes a comparator connected to said processor and to said data store for loading a coded number from said processor into a memory location in said data store upon finding said coded number exceeded by a number previously stored in said memory location.

9. A routing node as defined in claim 6 or 7 wherein said delay-estimation circuitry further includes addressing means connected to said counting means, to said logic circuit and to said data store for feeding reading and writing addresses thereto in response to signals from said counting means indicating the number of message packets received by a transmitting buffer during a busy period and for shifting in response to signals from said logic circuit, by at least one digit, a coded number transmitted from said counting means.

10. A routing node as defined in claim 9 wherein said addressing means includes a shift register connected to said counting means and to said logic circuit for decrementing, in response to signals received therefrom, a coded number transmitted from said counting means; a pointer connected to said logic circuit for receiving therefrom a signal coding a memory area assigned to a respective transmitting buffer; and an adder connected to said shift register, said pointer and said data store for feeding thereto addresses formed by algebraically combining address portions from said shift register and said pointer.

11. A method of routing an addressed message packet from a given node in a multinode packet-switching data-transmission network wherein a plurality of transmitting buffers in said given node are connected to respective outgoing transmission paths extending to a terminal node, at least one of said paths extending over a relay node to said terminal node, comprising the steps of:

at least temporarily storing path delays assigned to message-packet transmission over respective paths extending from said buffers to said terminal node;

calculating, at least partially on the basis of queue lengths at said given node, incremental delays assigned to respective transmitting buffers of said given node;

adding said incremental delays to respective path delays to obtain total delay times assigned to respective transmitting buffers;

comparing said total delay times to determine a minimal total delay time;

routing said packet from said given node over a transmitting buffer and an outgoing path having said minimal total delay time; and communicating said minimal total delay time to nodes in said network upstream of said given node as seen from said terminal node.

12. A method as defined in claim 11, wherein said given node includes a receiving buffer selectively connectable to each transmitting buffer, further comprising the steps of calculating an incremental delay assigned to said receiving buffer and adding this delay to said minimal total delay time before communicating same to upstream nodes.

* * * * *